(No Model.)
F. F. WARTHEN.
APPARATUS FOR MAKING FRIED OYSTERS.
No. 481,337. Patented Aug. 23, 1892.
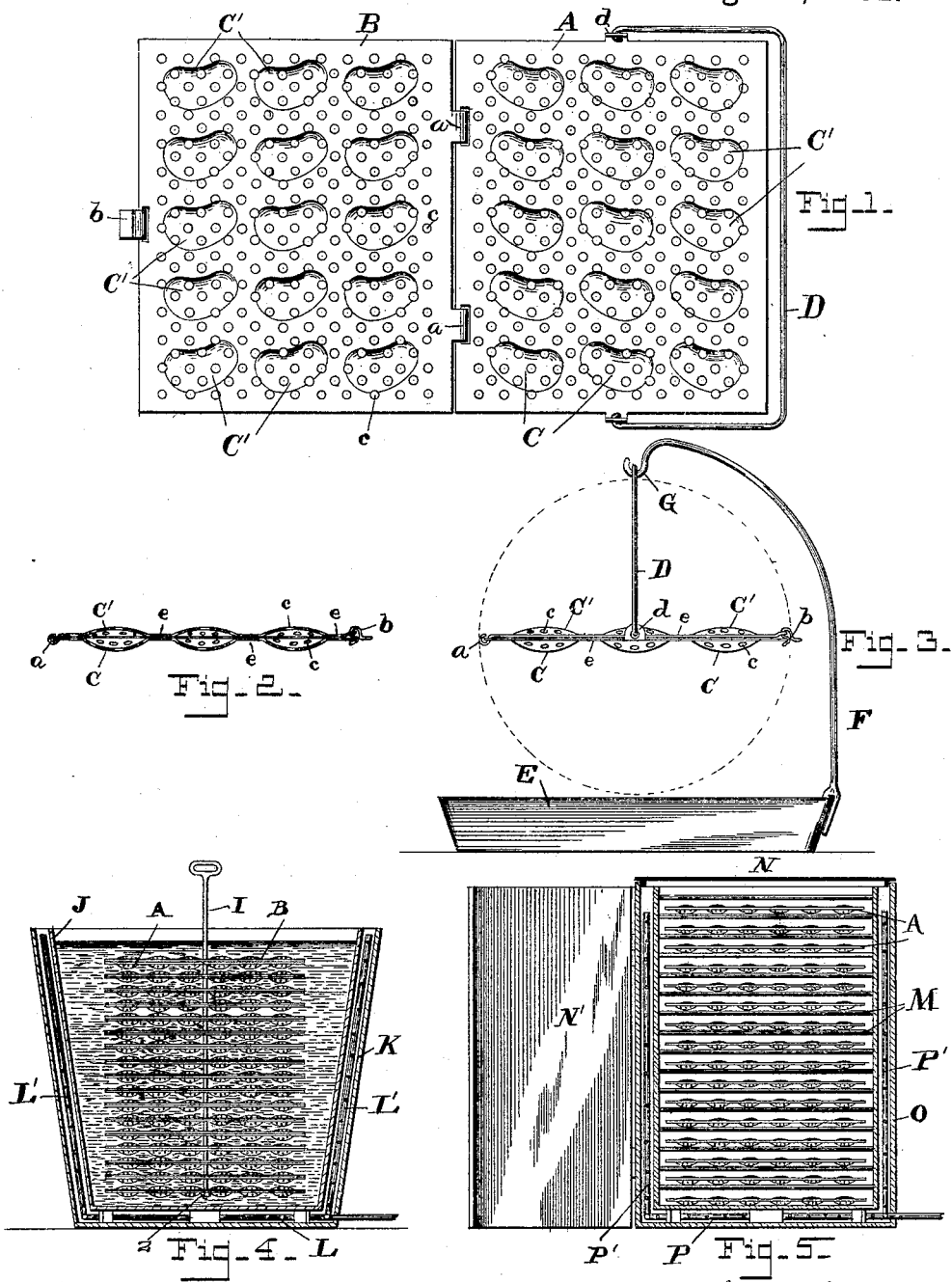
Witnesses:
Otto H. Ehlers
Frank P. Davis
Inventor:
Franklin F. Warthen
By Chas. B. Mann,
Attorney.

UNITED STATES PATENT OFFICE.

FRANKLIN F. WARTHEN, OF BALTIMORE, MARYLAND.

APPARATUS FOR MAKING FRIED OYSTERS.

SPECIFICATION forming part of Letters Patent No. 481,337, dated August 23, 1892.

Application filed December 17, 1891. Serial No. 415,346. (No model.)

*To all whom it may concern:*

Be it known that I, FRANKLIN F. WARTHEN, a citizen of the United States, residing at Baltimore, Maryland, have invented certain new and useful Improvements in Apparatus for Making Fried Oysters, of which the following is a specification.

This invention relates to an improved apparatus for making fried oysters. The usual way is to form or pad the oyster by working it into shape with the hands. To do this well requires considerable skill in order to prevent breaking apart when the oyster is placed in the frying pan or kettle. It is also a slow process, as each oyster has to be handled and turned separately, and besides this the flavor of the oyster is partially destroyed by mashing and breaking it in the shaping or padding operation.

The object of this invention is to provide an apparatus which will form or pad the oyster and in which it may be fried so that there is no possibility of its breaking and so that it may be handled with much greater facility.

The invention is illustrated in the accompanying drawings, in which—

Figure 1 shows a plan of the forming and frying device open; Fig. 2, a cross-section of the same closed. Fig. 3 illustrates its use in the operation of frying. Fig. 4 shows the manner in which the invention is employed in frying a large quantity of oysters at once, and Fig. 5 illustrates how the apparatus may be employed in preserving fried oysters in condition for serving at any time.

The forming and frying device comprises two rectangular pieces of perforated sheet-tin A B. A number of molds C are stamped out of the bottom sheet A, and each is of such a depth as to receive sufficient material to form a fried oyster. The other sheet B is the cover, and has corresponding molds C' stamped out of it, but only slightly raised, and forming covers for the molds C. The portions *e* of the two sheets between the molds fit close together when the device is closed, and thus the parts C C' form complete molds, as seen in Fig. 2. The two sheets A B are connected at one side by a separable hinge *a*, and at the opposite side by a suitable clasp *b*, attached to the top sheet and arranged to take over the edge of the bottom one.

The oysters are padded or formed by first covering the bottoms of the molds C in the bottom sheet with a layer of cracker-dust, and then filling in with oysters and covering the same with another layer of cracker-dust. The cover B is then shut down and the oysters are molded in the shape of the molds C C' and held by them in this shape, whereby they cannot break apart. At the same time the condition of the oysters is not affected by crushing them, as in the operation of making by hand; but they retain their natural flavor. When a single one of the devices is used, as in a private family, a bail D will be pivoted in ears *d* on the lower sheet A in such manner that the whole fryer or frame may be turned over freely in the bail. When used in this way it will be in connection with a fry-pan E, having a vertical rod F at one side formed at its upper end into an overhanging hook G. After the oysters have been formed or padded in the frame in the manner previously explained said frame is placed in the pan E, which contains the hot lard or other frying substance, and when one side has been browned the fryer is lifted and hung by its bail D on the hook G, and then turned over, as indicated, and again placed in the pan and the other side browned. The frier is then removed and opened, and the oyster may be taken out and served and will retain the exact shape of the molds C C'. In the frying operation the lard has free access to all the molds and padded oysters contained therein through the perforations *c* in the metal, and the oyster will therefore be thoroughly and uniformly browned.

Where a large number of fries are desired at one time, as in restaurants, a corresponding number of fryers or frames are filled with oysters and strung on a rod I, as shown in Fig. 4, and secured by a nut *z*, which draws them close together. This rod, with the friers attached, is lowered into a kettle J, filled with hot lard, and all the oysters are thus submerged therein, and hence do not need to be turned. When done they are removed and taken off the rod and the frames opened and oysters taken out and served. In order to keep the lard hot enough so as not to be cooled sufficiently by the metal of the frame as to affect the frying of the oysters, the kettle is encased in a jacket K, which will contain in its bottom a circular gas-pipe L, from which rise a number of pipes L', extending to the top of the kettle. These pipes are perforated and the jacket K provided with openings, through which a lighted match may be inserted to ignite the gas. Gas-jets will in this way strike the kettle on all sides and thus keep the lard always hot.

When it is desired to keep a large number of fried oysters on hand to be served out one by one, they will first be fried in the manner last described, but will be left in the frying-frames, the tops of which only will be removed, this being permitted by the separable hinges $a$. The lower parts of the frames, which contain the oysters, are placed on shelves M in a suitable oven N, and there kept hot.

When it is desired to serve an oyster, the door N' of the oven is opened and one of the frames drawn out and the oyster removed from its mold. This oven is shown with a jacket O, in the bottom of which is a circular gas-pipe P, from which rise a number of pipes $p'$, so that the oven may be heated on all sides.

The advantages of my arrangement will be obvious, for by it the oysters are shaped or padded without handling them and held in such shape while being fried, whereby they are in good condition when served, being improved both in appearance and quality over those cooked in the old way. It is evident the frying of oysters is greatly facilitated by use of my apparatus.

Having thus described my invention, what I claim as new, and desire to secure by Letters Patent, is—

1. An oyster padder and frier consisting of two sheet-metal pieces hinged together at one side and having a connecting-fastener at the opposite side, one of said pieces being formed with perforated molds for receiving the oyster and the material for padding it and the other formed with perforated covers for said molds, the portions of the two sheets between the molds fitting close against each other, as described.

2. An apparatus for frying oysters, comprising a perforated mold made up of two sections hinged together at one side and having a connecting-fastener at the opposite side and provided with ears at two opposite sides, a swinging bail pivoted in said ears, a receptacle for containing the frying substance, in which the perforated mold is placed, and an overhanging hook fastened to the said receptacle and arranged to receive the bail of the mold and hold the latter suspended while it is turned over in the bail, in the manner described.

In testimony whereof I affix my signature in the presence of two witnesses.

FRANKLIN F. WARTHEN.

Witnesses:
FRANK P. DAVIS,
JNO. T. MADDOX.